United States Patent [19]

Tack

[11] Patent Number: 5,906,970
[45] Date of Patent: May 25, 1999

[54] ADDITIVES AND OLEAGINOUS COMPOSITIONS CONTAINING A DENDRINE COLDFLOW IMPROVER ADDITIVE

[75] Inventor: Robert Dryden Tack, Oxfordshire, United Kingdom

[73] Assignee: Exxon Chemical Patents Inc., Linden, N.J.

[21] Appl. No.: 08/793,652

[22] PCT Filed: Oct. 19, 1995

[86] PCT No.: PCT/EP95/04138

§ 371 Date: Mar. 20, 1997

§ 102(e) Date: Mar. 20, 1997

[87] PCT Pub. No.: WO96/12755

PCT Pub. Date: May 2, 1996

[30] Foreign Application Priority Data

Oct. 19, 1994 [GB] United Kingdom .................. 9421282

[51] Int. Cl.⁶ .................. C10M 145/14; C10M 149/08; C10M 159/00; C10L 1/16
[52] U.S. Cl. .................. 508/470; 508/110; 508/446; 508/454; 508/545; 508/556; 508/558; 508/591; 44/300; 44/386; 44/391; 44/392; 44/432; 44/459
[58] Field of Search ..................... 508/110, 446, 508/454, 470, 545, 556, 558, 591; 44/300, 386, 391, 392, 432, 459

[56] References Cited

U.S. PATENT DOCUMENTS

| 3,048,479 | 8/1962 | Ilnyckyj ..................... 44/393 |
| 4,694,064 | 9/1987 | Tomalia et al. ........................ 528/332 |
| 4,938,885 | 7/1990 | Migdal ..................... 508/291 |
| 5,041,516 | 8/1991 | Fréchet et al. ............................ 528/44 |
| 5,558,802 | 9/1996 | Dowling ................................. 508/391 |
| 5,652,202 | 7/1997 | Adams ..................... 508/232 |

FOREIGN PATENT DOCUMENTS

| 225688 | 6/1987 | European Pat. Off. . |
| 2390496 | 12/1978 | France . |
| 8605501 | 9/1986 | WIPO . |
| 9314147 | 7/1993 | WIPO . |
| 9321259 | 10/1993 | WIPO . |

*Primary Examiner*—Jerry D. Johnson
*Attorney, Agent, or Firm*—Ohlandt, Greeley, Ruggiero & Perle

[57] ABSTRACT

A dendrimer-based cold flow additive material.

16 Claims, No Drawings

ADDITIVES AND OLEAGINOUS COMPOSITIONS CONTAINING A DENDRINE COLDFLOW IMPROVER ADDITIVE

This application is a 371 of PCT/EP95/04138 filed Oct. 19, 1995.

This invention relates to materials suitable for use as additives to oils, especially to fuel and lubricating oils, to oleaginous compositions containing the materials, and to processes for the manufacture of the materials.

Modern fuel and lubricating oils contain additives for various purposes. Numerous categories of such additives are known, and include, for example, detergents, cold flow improvers, antioxidants, corrosion inhibitors, dehazers, demulsifiers, metal deactivators, antifoams, dispersants, cetane or octane enhancers, lubricity improvers, antistatic agents, and viscosity modifiers. Within each such category, many materials (whether, for example, specific identifiable compounds, macromolecules, functionalized polymers or materials whose structure is not fully determined) are in commercial use or have been proposed in the literature. Such additives are referred to in this specification as oil additive materials.

Additives to improve one characteristic of an oil may, however, have deleterious effects on another of its characteristics. Furthermore, it is not uncommon for two additives, whether in the same or different categories, to have undesirable interactions causing, for example, gelling, either in the oil or in a multi-component additive package.

The present invention is concerned with providing a material suitable for use as an oil additive capable of carrying out its intended function and having a reduced tendency adversely to interact with another additive or affect an oils desirable characteristics.

The invention is more especially concerned with providing a material for use as a cold flow improver, especially for use in fuel oil compositions susceptible to wax formation at low temperatures.

Oils, especially fuel oils, whether derived from petroleum or from vegetable sources, contain components, namely, alkanes, that at low temperature tend to precipitate as large crystals or spherulites of wax in such a way as to form a gel structure which causes the fuel to lose its ability to flow. The lowest temperature at which the oil will still flow is known as the pour point.

As the temperature of the oil, which for convenience will be referred to as a fuel, falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuels. Similarly, other additives have been proposed and are in commercial use for reducing the size and changing the shape of the wax crystals that do form. Smaller size crystals are desirable since they are less likely to clog a filter. The wax from a diesel fuel, which is primarily an n-alkane wax, crystallizes as platelets; certain additives inhibit this and cause the wax to adopt an acicular habit, the resulting needles being more likely to pass through a filter than are platelets. The additives may also have the effect of retaining in suspension in the fuel the crystals that have formed, the resulting reduced settling also assisting in prevention of blockages.

The present invention provides an oil soluble dendrimer-based cold flow improver comprising a central core linked through a plurality of polar groups to a dendritic body which is linked through a plurality of polar groups to a hydrocarbyl periphery, the periphery consisting of n-alkyl groups which contain from 8 to 1000 carbon atoms.

As described by Tomalia et al, Angew. Chem. Int. Ed. Engl., 29 (1990), 138, dendrimers are three-dimensional highly-ordered oligomers or polymers. They are obtainable by reiterative reaction sequences starting from an initiator core having one or more reactive sites. To each reactive site is attached one functional group only of a polyfunctional reactant. The reactant is then caused to react through its remaining functional group or groups with additional molecules either the same as the original core if it is polyfunctional or a different, polyfunctional, molecule or molecules, and so on, in each case under reaction conditions such that unwanted side reactions, for example, crosslinking, are avoided. In this way, a dendritic body is built up around the central core, each reiterative reaction sequence adding further reactants (or 'units') to the ends of the dendrites. Tomalia describes the manufacture of polyamidoamine (PAMAM) dendrimers; these may be made based on ammonia as a core, which is caused to react by Michael addition with methyl acrylate (Step A). The carboxyl group of the acrylate molecule is caused to react with one amino group only of ethylene diamine (Step B). The resulting triamine core cell is referred to by Tomalia as Generation 0; a further repetition of steps A and B provides a hexamine, referred to as Generation 1. Further repetitions of steps A and B produce higher generations which after Generation 4 result in concentric spheres of cells, the outermost sphere carrying external reactive groups. Other dendrimers described by Tomalia include polyethylenimine, hydrocarbon, polyether, polythioether, polyamide, polyamido-alcohol and polyarylamine dendrimers.

Polyamide- and ester-based dendrimers are also described by Newkome et al, J. Am. Chem. Soc., 112 (1990) 8458. Use of a long-chain-alkylene dibromide as core provided a dendrimer (referred to by Newkome as an arboral) in the form of two spheres linked by an alkylene chain. U.S. Pat. No. 5,041,516 describes molecules similar to those of Tomalia, but made by a "convergent" approach, i.e., starting with the outer surface of the dendrimer, building up a wedge-shaped molecule, and finally reacting a plurality of the "wedges" with a core molecule. GB-A-1575507 describes star-shaped polymers and their use as viscosity improvers, these polymers being based on a cross-linked divinylbenzene core and isoprene branches; in EP-A-368395 such a hydrocarbon polymer is functionalized through a sulphonamide linkage to provide carboxyl terminal groups.

In Chemical and Engineering News for Aug. 16, 1993, O'Sullivan describes a polypropylenimine dendrimer obtained by Michael addition of acrylonitrile to 1,4-diaminobutane, and reduction of the nitrile group to amino groups over Raney cobalt. Repeated four times, this procedure gives a dendrimer which theoretically has 64 amino groups. PCT Application WO 93/14147 contains a similar disclosure. The disclosures of all of the above documents are incorporated herein by reference.

The number of layers that it is possible to construct varies with the reactants as does the closeness of the packing within the dendrimer, and hence the size of channels between its branches. PAMAM dendrimers have a large internal surface area which, in proportion to the external surface area, increases with the number of generations. In contrast, polyether dendrimers have very little proportional internal surface, which reaches a maximum at Generations 3 to 4.

As indicated above, the successive layers of cells may be the same or different, and mixtures of two or more reactants, for example as described by Tomalia at page 148, may be used.

If desired, the outer layer of the dendrimer may be designed to give, for example, hydrophobicity; Tomalia describes treating PAMAM with carboxylated polystyrene, thus adding a hydrocarbyl periphery and giving a hydrocarbon-soluble dendrimer-based material.

According to this invention, after a desired number of reaction steps or, in the case of certain dendrimers, the limited number of reaction steps available because of steric restrictions on growth ("dense packing"), functional, n-alkyl moieties are attached through the external reactive groups of the dendrimer to form a-hydrocarbyl periphery. If the dendrimer already has chains or segments of its dendrites that will, if incorporated in an oil, have cold flow improver activity the final moieties may simply confer oil solubility. Otherwise, the final moieties should confer cold flow improver activity on the dendrimer, optionally also conferring oil solubility if required.

Numerous types of cold flow additives are known, being either commercially available or described in the literature. The additives of the present invention may incorporate the functional part of a known type of additive at a desired generation in a dendrimer precursor in a manner that retains the portion of the additive material that is required for it to carry out its function as a cold flow additive.

The invention also provides a process for the manufacture of a dendrimer-based cold flow improver, in which a core molecule having a plurality of reactive sites is caused to undergo a stepwise reaction involving a plurality of steps, or a plurality of a combination of steps, in which the number of reactive sites is increased, whereby a dendrimer is formed, and the resulting dendrimer is subjected to a reaction in which n-alkyl substituents are peripherally attached to the dendrimer at at least some of the reactive sites.

Preferably, the dendrimer to which the n-alkyl periphery is attached is that obtainable by two or three steps, or combinations of steps, multiplying the number of reactive sites on the core. Advantageously, the core has two or three reactive sites and each step, or combination of steps, doubles the number of reactive sites.

The stepwise reactions are such as to result in polar groups. As examples of stepwise reaction, there may be mentioned, using as an exemplary core molecule a nucleophilic core, e.g., ammonia or a polyamine (e.g., a diamine), as a first one of a two-part combination of steps, the Michael addition of a vinyl compound such as acrylonitrile or an acrylate ester, e.g. methyl acrylate. The second part comprises, in the case of acrylonitrile, the reduction of each nitrile group to a primary amine (using for example hydrogenation over Raney Co or Ni) and, in the case of the acrylate, reaction with an excess of ethylenediamine to provide a polyamino core cell.

In each case, the resulting product contains a multiple of the original number of amine nitrogens. The iterative step procedure may then be repeated, it being understood that subsequent steps or combinations of steps are not necessarily carried out in the same way.

As a further example, there may be mentioned the use as core of pentaerythrityl bromide, as the first one of a two part step combination the reaction with a masked pentaerythritol bicyclic orthoester, and as the second part the removal of the protective mask to yield a dendrimer with three hydroxyl groups per terminal group.

Advantageously, the core and dendritic body may together form a polyamidoamine or polyaminoamine dendrimer suitable for forming the cold flow improver of the invention. Alternatively, they may together form a polyether-, polyamide- or polyester-based dendrimer.

The present invention further provides a process for the manufacture of a dendrimer-based cold flow improver having a polyfunctional core connected to a periphery by a dendritic body, which comprises constructing a macromolecule by a stepwise reaction involving a plurality of steps, or a plurality of combination of steps, commencing with the reaction of a first compound comprising an n-alkyl moiety and a single reactive group with a second compound having a single non-reactive but activatable group and a plurality of groups reactive with the single reactive group of the first compound, to form a, or part of a, dendritic body, and activating the non-reactive group, repeating the steps if desired or required, to form a dendritic wedge having an active group at its focal point, and attaching such a wedge to each of the functional groups of the polyfunctional core.

The n-alkyl groups of the periphery advantageously contain from 8 to 40, preferably from 10 to 30, carbon atoms. Each n-alkyl group is linked to an external functional group of the dendrimer, e.g., if the dendrimer has external amino groups, the n-alkyl groups may be linked by a terminal carboxy group forming an amide or imide linkage. Other suitable linkages may be formed using alkyl halides, alkyl toluene sulphonates or sulphates, alkyl acrylates or methacrylates. A dendrimer-based cold flow additive of this type normally provides an oil-soluble wax crystal nucleator, and is advantageously employed together with a wax crystal-shape modifier, e.g., an ethylene/unsaturated ester, especially vinyl acetate, copolymer, a polar nitrogen compound, or a fumarate/vinyl acetate copolymer, especially for use in a wax-containing fuel oil, e.g., a diesel fuel.

As indicated above a dendrimer-based cold flow additive of the invention may be used in an oil or additive concentrate in conjunction with another additive or additives with a resulting reduction in adverse interaction. Such other additive or additives may be for the same or a related purpose as the dendrimer-based additive, or for a different purpose. Any other additive may be in conventional form or may also be dendrimer-based.

The present invention accordingly also provides a composition comprising an oil and a dendrimer-based cold flow additive according to the invention. The invention further provides an additive concentrate comprising a dendrimer-based cold flow additive according to the invention in an oil or a solvent miscible with oil. The invention also provides an oil, and an additive concentrate, containing at least two oil additives, at least one being a dendrimer-based cold flow additive. The oil is advantageously a fuel or lubricating oil.

In the oil-containing compositions of the invention, the oil may be a crude oil, i.e. oil obtained directly from drilling and before refining.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain other additives depending on its intended use; examples are viscosity index improvers such as ethylene-propylene copolymers, succinic acid based dispersants, metal-containing dispersant additives and zinc dialkyldithiophosphate antiwear additives.

The oil may be a fuel oil, e.g., a petroleum-based fuel oil, especially a middle distillate fuel oil. Such distillate fuel oils generally boil within the range of from 110° C. to 500° C., e.g. 150° C. to 400° C. The fuel oil may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oil or of both.

The fuel oil may have a sulphur content of 0.2%, for example 0.05%, even 0.01%, by weight or less based on the weight of the fuel. The art describes methods for reducing the sulphur concentration of hydrocarbon middle distillate fuels, such methods including solvent extraction, sulphuric acid treatment, and hydrodesulphurisation. The invention is also applicable to vegetable-based fuel oils, for example rape seed oil, used alone or in admixture with a petroleum distillate oil.

A fuel oil according to the invention advantageously contains a dendrimer-based additive in a proportion of 0.0001 to 1%, more advantageously from 0.001 to 0.5%, preferably from 0.1 to 0.2%, by weight of active ingredient based on the weight of oil, while a lubricating oil according to the invention may contain up to 10%, more advantageously up to 5%, of the additive.

A concentrate according to the invention advantageously contains from 3 to 75%, more advantageously from 3 to 60%, and preferably from 10 to 50%, by weight of the dendrimer-based additive, in oil or a solvent miscible with oil.

The invention also provides the use of a dendrimer-based cold flow additive in an oil or in an additive concentrate to mitigate an adverse effect on oil characteristics or an adverse interaction with another additive present.

The additive concentrate and the oil composition may contain other additives for improving low temperature and/or other properties, many of which are in use in the art or known from the literature.

For example, the composition may also contain an ethylene-vinyl ester copolymer. As disclosed in U.S. Pat. No. 3,961,916, flow improver compositions may comprise a wax growth arrestor, or inhibitor, and a nucleating agent. Without wishing to be bound by any theory, the applicants believe that a dendrimer according to the present invention having long chain alkyl groups on its surface acts primarily as a wax nucleator and will benefit from the presence of a wax growth inhibitor. That material may be an ethylene/unsaturated ester, especially an ethylene/vinyl acetate, copolymer having a relatively low molecular weight and relatively high ester content, for example, a molecular weight within the range of from 1400 to 7000, measured by GPC, especially about 3300, and an ester content of from 10 to 25 molar especially about 15%.

The additive concentrate or the oil-comprising composition may also comprise polar nitrogen compounds, for example those described in U.S. Pat. No. 4,211,534, especially an amide-amine salt of phthalic anhydride with two molar proportions of hydrogenated tallow amine, or the corresponding amide-amine salt of ortho-sulphobenzoic anhydride. These also are believed to act as wax growth inhibitors.

The additive composition may also comprise a comb polymer. Such polymers are polymers in which hydrocarbyl groups are pendant from a polymer backbone, and are discussed in "Comb-Like Polymers. Structure and Properties", N. A. Platé and V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar per cent of the units of which have, side chains containing at least 6, and preferably at least 10, atoms.

As examples of preferred comb polymers there may be mentioned those of the general formula

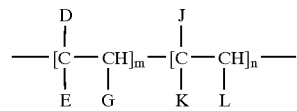

wherein D=$R^{11}$, $COOR^{11}$, $OCOR^{11}$, $R^{12}COOR^{11}$, or $OR^{11}$,
E=H, $CH_3$, D, or $R^{12}$,
G=H or D
J=H, $R^{12}$, $R^{12}COOR^{11}$, or an aryl or heterocyclic group,
K=H, $COOR^{12}$, $OCOR^{12}$, $OR^{12}$ or $COOH$,
L=H, $R^{12}$, $COOR^{12}$, $OCOR^{12}$, $COOH$, or aryl,
$R^{11} \geq C_{10}$ hydrocarbyl,
$R^{12} \geq C_1$ hydrocarbyl or hydrocarbylene,
and m and n represent mole ratios, m being within the range of from 1.0 to 0.4, n being in the range of from 0 to 0.6. $R^{11}$ advantageously represents a hydrocarbyl group with from 10 to 30 carbon atoms, while $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and ioctadecene.

The acid or anhydride group of the comb polymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such for example as those described in European Patent Applications 153176, 153177 and 225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight. The particularly preferred comb polymers are those having a number average molecular weight, as measured by vapour phase osmometry of 1,000 to 100,000, more especially 1,000 to 30,000.

Other suitable comb polymers are the polymers and copolymers of a-olefins and esterified copolymers of styrene and maleic anhydride, and esterified copolymers of styrene and fumaric acid; mixtures of two or more comb polymers may be used in accordance with the invention and, as indicated above, such use may be advantageous.

Other examples are condensates such as described in EP-A-327,423. The additive concentrate or oil-comprising composition may also include a compound containing a cyclic ring system carrying at least two substituents of the general formula below on the ring system

where A is a linear or branched chain aliphatic hydrocarbylene group optionally interrupted by one or more hetero atoms, and $R^{15}$ and $R^{16}$ are the same or different and each is independently a hydrocarbyl group containing 9 to 40 atoms optionally interrupted by one or more hetero atoms, the substituents being the same or different and the compound optionally being in the form of a salt thereof. Preferably, A has from 1 to 20 carbon atoms and is preferably a methylene or polymethylene group. Such compounds are described in WO 93/04148.

The additive concentrate or the oil-comprising composition of the invention may also comprise a hydrocarbon polymer.

Examples of suitable hydrocarbon polymers are those of the general formula

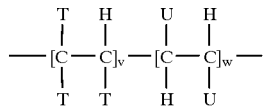

wherein T=H or $R^{21}$ wherein
$R^{21}=C_1$ to $C_{40}$ hydrocarbyl, and
U=H, T, or aryl
and v and w represent mole ratios, v being within the range of from 1.0 to 0.0, w being in the range of from 0.0 to 1.0.

The hydrocarbon polymers may be made directly from monoethylenically unsaturated monomers or indirectly by hydrogenating polymers from polyunsaturated monomers, e.g., isoprene and butadiene.

Examples of hydrocarbon polymers are disclosed in WO 91/11488.

Preferred copolymers are of ethylene and at least one a-olefin, having a number average molecular weight of at least 30,000. Preferably the α-olefin has at most 28 carbon atoms. Examples of such olefins are propylene, ibutene, isobutene, n-octene-1, isooctene-1, n-decene-1, and n-dodecene-1. The copolymer may also comprise small amounts, e.g, up to 10% by weight of other copolymerizable monomers, for example olefins other than α-olefins, and non-conjugated dienes. The preferred copolymer is an ethylene-propylene copolymer. it is within the scope of the invention to include two or more different ethylene-α-olefin copolymers of this type.

The number average molecular weight of the ethylene-α-olefin copolymer is, as indicated above, preferably at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 percent. More advantageously, the ethylene content is within the range of from 57 to 80%, and preferably it is in the range from 58 to 73%; more preferably from 62 to 71%, and most preferably 65 to 70%.

Preferred ethylene-α-olefin copolymers are ethylenepropylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive concentrate or the oil-comprising composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent although for ethylene-propylene copolymers up to 86 molar per cent by weight ethylene may be employed with advantage.

The additive concentrate or the oil-comprising composition may also comprise a polyoxyalkylene compound. Examples are polyoxyalkylene esters, ethers, ester/ethers and mixtures thereof, particularly those containing at least one, preferably at least two, $C_{10}$ to $C_{30}$ linear alkyl groups and a polyoxyalkylene glycol group of molecular weight up to 5,000, preferably 200 to 5,000, the alkyl group in said polyoxyalkylene glycol containing from 1 to 4 carbon atoms. These materials form the subject of EP-A-0 061 895. Other such additives are described in U.S. Pat. No. 4,491, 455.

The preferred esters, ethers or ester/ethers are those of the general formula

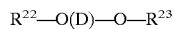

where $R^{22}$ and $R^{23}$ may be the same or different and represent
(a) n-alkyl—
(b) n-alkyl-CO—
(c) n-alkyl-O—$CO(CH_2)_n$—
(d) n-alkyl-O—$CO(CH_2)_n$—CO—
n being, for example, 1 to 30, the alkyl group being linear and containing from 10 to 30 carbon atoms, and D representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. D may also contain nitrogen.

Examples of suitable glycols are substantially linear polyethylene glycols (PEG) and polypropylene glycols (PPG)

having a molecular weight of from 100 to 5,000, preferably from 200 to 2,000. Esters are preferred and fatty acids containing from 10–30 carbon atoms are useful for reacting with the glycols to form the ester additives, it being preferred to use a $C_{18}$–$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates, when minor amounts of monoethers and monoesters (which are often formed in the manufacturing process) may also be present. It is preferred that a major amount of the dialkyl compound be present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos. 2-51477 and 3-34790, and the esterified alkoxylated amines described in EP-A-117,108 and EP-A-326,356.

In addition, the additive concentrate and the fuel oil composition may contain additives for other purposes, e.g., for reducing particulate emission or inhibiting colour and sediment formation during storage.

The following Examples illustrate the invention. Unless otherwise indicated, all parts and percentages are by weight.

EXAMPLES A TO C

Michael Addition and Hydrogenation (a) Ethylene diamine, 1.2 g, 20 mmole, was heated with 20 ml acrylonitrile, at reflux (77° C.), for 24 hours in the presence of 20 mmole per primary amine function of glacial acetic acid as catalyst. Excess acrylonitrile was then removed under vacuum, the residue extracted with chloroform, and concentrated aqueous ammonia (40 ml) added to neutralize the acid. The organic phase was separated, washed with water and dried over anhydrous magnesium sulphate. The crude material was purified by column chromatography with chloroform.

N,N,N$^1$,N$^1$-tetrakis(2-cyanoethyl)diaminoethane, m.p. 61–62° C., was recovered at 90% of theoretical yield.

(b) To reduce the nitrile product from step (a) to the corresponding tetramine, anhydrous methanol was saturated with ammonia at 0° C. to give an approximately 10N solution. A solution of 10 mmole of the nitrile in a volume of the resulting methanolic ammonia sufficient to provide approximately 8 $NH_3$ per CN group and 2 g Raney nickel catalyst, were placed in a hydrogenation bomb, filled with hydrogen at 1400 psi (9.65 MPa) and maintained at 130° C. for 2 days. After cooling, the catalyst was filtered off, and methanol and ammonia removed on a rotary evaporator. The residue was checked by NMR for the absence of cyano groups and used without purification to provide the starting material(2) for the next generation.

Reaction Scheme for Step (a) and (b)

Step (a) was repeated using (2) as starting material, the reaction being carried out for 2 days to yield the nitrile (3). Step (b) was repeated on the nitrile (3) to yield the corresponding octamine (4).

Reaction Scheme for repetition of (a) and (b)

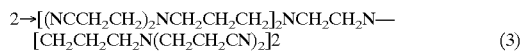

EXAMPLE B

The procedure of Example A was repeated, using ammonia as the core material. The reaction sequence is summarized below.

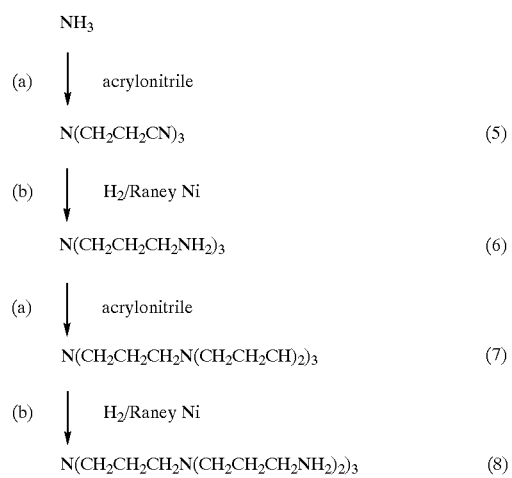

EXAMPLE C

The procedure of Example A was repeated using tris(2-aminoethyl)amine as the core material. The reaction sequence is summarized below.

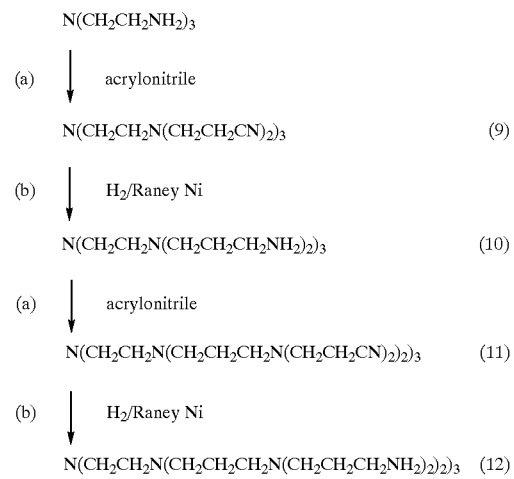

SUMMARY OF EXAMPLES A, B, AND C

In each case, the first nitrile was obtained pure, and attempts to purify the subsequent polyamine by column chromatography or distillation were unsuccessful. The crude products were accordingly used for the subsequent reactions with acrylonitrile, it proving possible to obtain the resulting nitrites in a reasonably pure state by column chromatography. The hydrogenation products obtained in the final stage were again not pure, based on examination of their $^{13}$CNMR spectra.

EXAMPLES 1 TO 4—PREPARATION OF DENDRIMER-BASED COLD FLOW ADDITIVES

In Examples 1 to 4 and Comparative Examples 1 and 2 below, amino-terminated products of the dendrimer Examples above and other amines were provided with terminal long chain alkyl groups by reaction of the terminal primary amines either with n-eicosyl acrylate (hereinafter n-$C_{20}$ acrylate), with an acrylate of mixed normal $C_{22}$ to $C_{28}$ alcohols (hereinafter n-$C_{22}$+ acrylate) commercially available as Nafol 22+, or with a blend of the n-$C_{20}$ acrylate and the n-$C_{22}$+ acrylate. This acrylate blend is referred to as $C_{20}/C_{22}$+ acrylate. The long chain acrylates are made by transesterification of excess methyl acrylate with the relevant alcohol or alcohols.

Reaction of the amine with the long chain alkyl acrylate is effected by mixing the reactants in the melt in the molar proportions indicated and maintaining them at 80 to 100° C. for from 2 to 120 hours. The reaction is monitored by HNMR spectroscopy, which clearly shows the disappearance of the acrylate and formation of the adduct. The small amine (octadecylamine) reacts with the n-$C_{20}$ acrylate completely in 2 hours, but the tetracosamine dendrimer took 5 days for complete reaction at 80° C.

EXAMPLE 1

The product (10) of Example C was treated in the melt at 80° C. to 100° C. for 60 hours with n-$C_{20}$ acrylate at a molar ratio of 1:6.

EXAMPLE 2

The product (10) of Example C was treated as in Example 1 with $C_{22}$+ acrylate at a molar ratio of 1:6.

EXAMPLE 3

1 molar equivalent of the product (4) of the second generation of Example A was treated as in Example 1 with 8 molar equivalents of n-$C_{20}/C_{22}$ acrylate, the acrylates being present in a molar ratio of 3:5.

EXAMPLE 4

The procedure of Example 3 was repeated on the product 12 of the third generation of Example C.

COMPARATIVE EXAMPLE 1 n-octadecylamine was treated with n-$C_{20}$ acrylate at a molar ratio of 1:1 under the conditions of Example 1.

COMPARATIVE EXAMPLE 2 n-octadecylamine was treated with n-$C_{20}$ acrylate at a molar ratio of 1:2 under the conditions of Example 1.

EXAMPLES 5 TO 16 AND COMPARATIVE EXAMPLES 3 TO 12

In the following examples, the products of the numbered Examples above were tested alone and in admixture with other cold flow improvers in two fuels, referred to as Fuel A and Fuel B, the characteristics of which are set out in Table I below.

TABLE I

| Fuels | A | B |
|---|---|---|
| Specific Gravity | 0.85 | 0.8568 |
| Cloud Point (°C.) | −6 | 2 |
| CFPP (°C.) | −8 | 0 |
| ASTM D86 Distillation, °C. | | |
| IBP | 252 | 221 |
| 10% | 265 | 253 |
| 20% | 270 | 262 |
| 50% | 284 | 285 |
| 90% | 320 | 335 |
| 95% | 331 | 354 |
| FBP | 347 | 372 |

The other cold flow improvers used in the examples below are Additive 1, an ethylene/vinyl acetate copolymer with a vinyl acetate content of 36% by weight and Mn (by GPC) of 3000, and Additive 2, an N,N-dialkylammonium salt of a 2-N1,N1-dialkylamidobenzoate. This is a half amide/half salt obtained by the reaction of one mole of phthalic anhydride and two moles of di(hydrogenated tallow) amine. Additives 1 and 2 are both wax growth inhibitors.

The additive was, or the additives were, dissolved in the fuels and the CFPP measured. The results are shown in Table II below.

TABLE II

| Example No. | Product of Example No. | Product, ppm | Add 1, ppm | Add 2, ppm | CFPP, °C. Fuel A | CFPP, °C. Fuel B | CFPP, °C. Improve't Fuel A | CFPP, °C. Improve't Fuel B |
|---|---|---|---|---|---|---|---|---|
| Comp 3 | — | 0 | 0 | 0 | −8 | 0 | base | |
| Comp 4 | — | 0 | 200 | 0 | −11 | −5 | base | |
| Comp 5 | — | 0 | 0 | 300 | −5 | −2 | base | |
| Comp 6 | — | 0 | 0 | 500 | −7 | −2 | base | |
| 5 | 1 | 200 | 0 | 0 | −12 | −7 | 4 | 7 |
| 6 | | 200 | 200 | 0 | −11 | −13 | 0 | 8 |
| 7 | | 100 | 0 | 400 | −11 | −5 | 5 | 3 |
| 8 | 2 | 200 | 0 | 0 | −11 | −4 | 3 | 4 |
| 9 | | 200 | 200 | 0 | −10 | −14 | (−1) | 9 |
| 10 | | 100 | 0 | 400 | −11 | −4 | 5 | 2 |
| 11 | 3 | 200 | 0 | 0 | −12 | −4 | 4 | 4 |
| 12 | | 200 | 200 | 0 | −10 | −14 | 0 | 9 |
| 13 | | 100 | 0 | 400 | −11 | −3 | 5 | 1 |
| 14 | 4 | 200 | 0 | 0 | −3 | −3 | (−5) | 3 |
| 15 | | 200 | 200 | 0 | −12 | −12 | 1 | 7 |
| 16 | | 100 | 0 | 400 | −6 | −6 | 0 | 4 |
| Comp 7 | Comp 1 | 200 | 0 | 0 | −8 | −2 | 0 | 2 |
| Comp 8 | | 200 | 200 | 0 | −9 | −4 | (−1) | (−1) |
| Comp 9 | | 100 | 0 | 400 | −9 | −3 | 3 | 1 |
| Comp 10 | Comp 2 | 200 | 0 | 0 | −9 | 0 | 1 | 0 |
| Comp 11 | | 200 | 200 | 0 | −11 | −3 | 0 | (−2) |
| Comp 12 | | 100 | 0 | 400 | −10 | −3 | 4 | 1 |

It will be noted that each additive according to the invention is tested in three compositions in each fuel. The "improvement" column contains comparisons as follows. The first composition contains the inventive or comparison additive alone; the "improvement" uses Comparison 3 (no additive) as base.

The second composition contains the additive together with additive 1; the "improvement" uses Comparison 4 (additive 1 only) as base.

The third comparison contains the additive together with Additive 2; the "improvement" uses the mean of comparisons 5 and 6 (additive 2 only) as base.

The results show that, in Fuel A, the products of Examples 1 to 3 improve CFPP when tested alone and with Additive 2, though Example 4 does not. The CFPP with Additive 1 is not improved either with the compounds of the invention or the Comparison compounds.

In Fuel B, the products of Examples 1 to 4 improve CFPP when tested alone, especially with Additive 1; the CFPP with Additive 2 is improved only slightly. The overall improvement is substantially greater with the dendrimer-based additives of the invention than with the reference compounds.

I claim:

1. A composition comprising an oil and a cold flow improving amount of a cold flow improver additive, wherein the cold flow improver additive comprises an oil soluble dendrine based oligomer or polymer in which the dendrine based oligomer or polymer has a central core with reactive sites and is selected from the group consisting of ammonia or a polyamine, and to which a multiple of the number of reactive sites of the central core has been added by a plurality of addition reactions of one functional group of a polyfunctional reactant to each reactive site to produce a dendritic body around said central core; and having a n-alkyl group attached to each peripheral functional group on the dendritic body.

2. A composition according to claim 1 wherein said polyfunctional reactant of said dendritic body is selected from the group consisting of acrylonitrile and an acrylate ester.

3. A composition according to claim 2 wherein the n-alkyl group has from between about 8 to 40 carbon atoms per alkyl group.

4. A composition according to claim 3 wherein said n-alkyl group is selected from n-eicosyl, a mixture of n-$C_{22}$ to $C_{28}$ alkyls, or mixtures thereof.

5. A composition according to claim 2 comprising at least one additional oil additive in addition to the dendrine based cold flow improver additive.

6. A composition according to claim 1 wherein the n-alkyl group has from between about 8 to 40 carbon atoms per alkyl group.

7. A composition according to claim 6 wherein said n-alkyl group is selected from n-eicosyl, a mixture of n-$C_{22}$ to $C_{28}$ alkyls, or mixtures thereof.

8. A composition according to claim 1 comprising at least one additional oil additive in addition to the dendrine based cold flow improver additive.

9. An additive concentrate comprising a dendrine based cold flow improver additive and an oil or a solvent miscible with oil, wherein the dendrine based cold flow improver additive comprises an oil soluble dendrine based oligomer or polymer in which the dendrine based oligomer or polymer has a central core with reactive sites and is selected from the group consisting of ammonia or a polyamine, and to which a multiple of the number of reactive sites of the central core has been added by a plurality of addition reactions of one functional group of a polyfunctional reactant to each reactive site to produce a dendritic body around said central core; and having a n-alkyl group attached to each peripheral functional group on the dendritic body.

10. An additive concentrate according to claim 9 wherein said polyfunctional reactant of said dendritic body is selected from the group consisting of acrylonitrile and an acrylate ester.

11. An additive concentrate according to claim 10 wherein the n-alkyl group has from between about 8 to 40 carbon atoms per alkyl group.

12. An additive concentrate according to claim 11 wherein said n-alkyl group is selected from n-eicosyl, a mixture of n-$C_{22}$ to $C_{28}$ alkyls, or mixtures thereof.

13. An additive concentrate according to claim 9 wherein the n-alkyl group has from between about 8 to 40 carbon atoms per alkyl group.

14. An additive concentrate according to claim 13 wherein said n-alkyl group is selected from n-eicosyl, a mixture of n-$C_{22}$ to $C_{28}$ alkyls, or mixtures thereof.

15. An additive concentrate according to claim 9 comprising at least one additional oil additive in addition to the dendrine based cold flow improver additive.

16. An additive concentrate according to claim 9 comprising at least one additional oil additive in addition to the dendrine based cold flow improver additive.

* * * * *